M. BARTHOLDY.
HOLE GAUGE.
APPLICATION FILED NOV. 6, 1920.

1,420,951.
Patented June 27, 1922.

Inventor,
Max Bartholdy.
By Knight Bros.
attys.

UNITED STATES PATENT OFFICE.

MAX BARTHOLDY, OF KARLSKOGA, SWEDEN, ASSIGNOR TO FRIED. KRUPP AKTIEN-GESELLSCHAFT, OF ESSEN-ON-THE-RUHR, GERMANY.

HOLE GAUGE.

1,420,951. Specification of Letters Patent. Patented June 27, 1922.

Application filed November 6, 1920. Serial No. 422,374.

*To all whom it may concern:*

Be it known that I, MAX BARTHOLDY, residing at Karlskoga, Sweden, a citizen of the German Republic, have invented a certain new and useful Improvement in Hole Gauges, for which I have filed application in Germany Nov. 3, 1919, and of which the following is a specification.

This invention relates to hole gauges which are provided with an adjustable touch element and a member which is adapted to be displaced at an angle to the direction of movement of the movable touch element and acts upon an indicating device, and in which there is provided between the movable touch element and the displaceable member an inclined face which is inclined to the direction of displacement of the displaceable member and is adapted to transmit movements. In the older gauges of this kind the parts are so arranged that pressure applied from outside to the adjustable touch element is unable to produce any movement of the displaceable member connected to the indicating device. In these gauges it is accordingly necessary to adjust the displaceable member by hand when measuring. The object of this invention is to provide a hole gauge of the kind described, in which movement by hand of the displaceable member which acts on the indicating device is not necessary.

Figure 1:
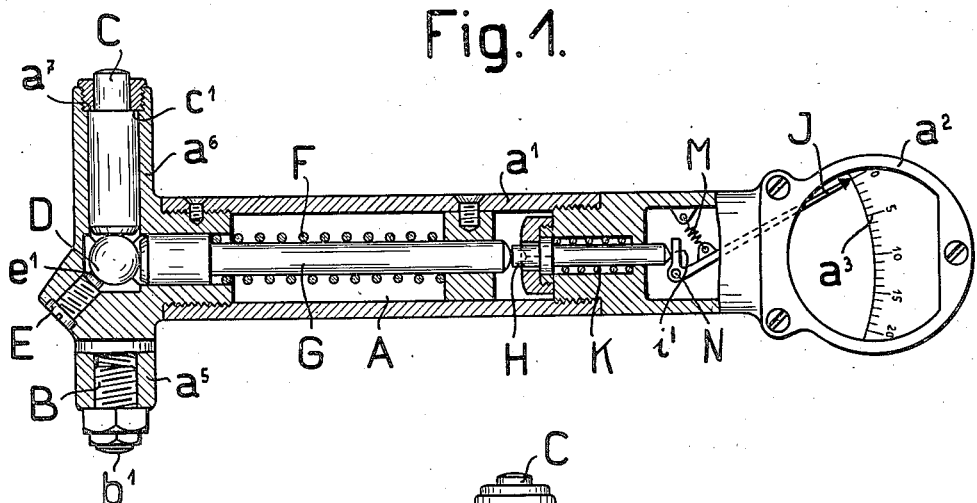
Figure 2:
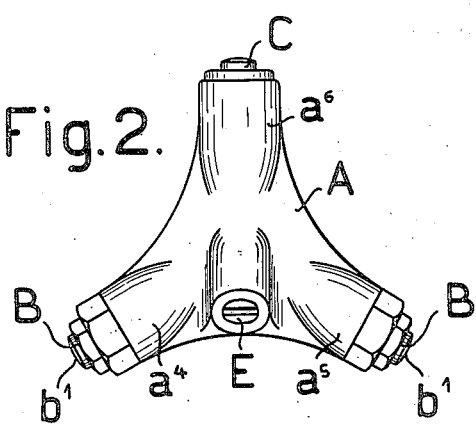
Figure 3:
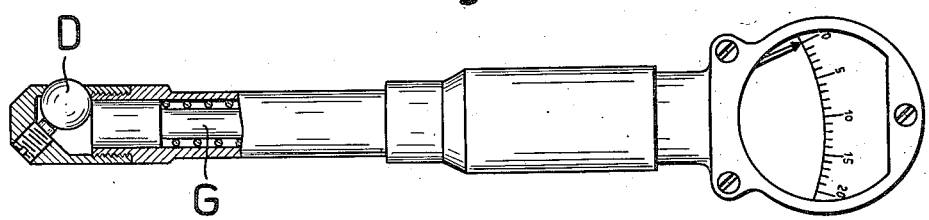
Figure 4:
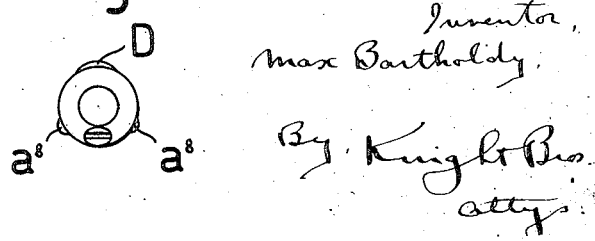

Two forms of execution of the subject matter of the invention, namely one suitable for gauging large and the other for gauging small holes, are shown in the annexed drawing in which:

Fig. 1 is a part-sectional view of the improved hole gauge destined for gauging large holes, Fig. 2 is the front view to Fig. 1, looking from the left, Fig. 3 is a part-sectional view of the improved hole gauge suitable for gauging small holes, and Fig. 4 a front view to Fig. 3.

The embodiment shown in Figs. 1 and 2 will be described first.

The casing A of the gauge consists of a substantially hollow cylindrical shank $a^1$, supporting at one end a head $a^2$, embodying a graduated scale $a^3$, and, at the other end, three arms $a^4$, $a^5$ and $a^6$, respectively. The longitudinal axes of these arms form angles of 120° relatively to each other and are disposed at right angles to the longitudinal axis of the shank $a^1$. The arms $a^4$ and $a^5$ are each provided, in the manner shown in the drawing, with a stationary touch bolt B terminating on the outside in a spherically curved surface $b^1$. The third arm $a^6$ is equipped with a touch bolt C displaceable within and projecting beyond said arm $a^6$, and similarly rounded off on the exterior. The extent to which the bolt C may be displaced is limited toward the exterior by a pair of check surfaces $a^7$ $c^1$. With its inner flat end, said bolt C bears up against a ball D adapted to turn on the level end face $e^1$ of a bolt E screwed into the casing A. The end face $e^1$ is disposed at an angle of 45° relatively to the longitudinal axis of the bolt C. Furthermore, a bolt G, adapted to be moved within the shank $a^1$ under the action of a spring F, bears up with its one end against the ball D. At the other end of the bolt G, under the influence of a spring K lies another bolt H. Against this latter there engages under the influence of a spring M, one end $i'$ of an indicator J, pivotally mounted on a fixed pin N, the end of which swings over a scale $a^3$.

The manner of operation of the improved instrument will be readily understood from the foregoing description and does not therefore require any further explanation.

The second form of execution as disclosed in Figs. 3 and 4, merely differs from the first form by the fact that the ball D, serving to displace the bolt G, forms at the same time the displaceable touch element proper, and further, that the gauge is provided in the place of the arms $a^4$ and $a^5$, supporting the stationary bolts B, with two centering-lugs $a^8$ shown in Fig. 4.

The manner of operation of this second form of construction will likewise be plain without further explanation.

Claims:

1. A hole gauge having a displaceable body, a member displaceable in a direction forming an angle with the direction of movement of said body, an indicating device, said displaceable member being connected to said indicating device, a member provided with a face, inclined to the direction of movement of said displaceable member, said body being movable on said face, the movement of said body producing movement of said displaceable member, 2. A hole gauge having a displaceable body, a member displaceable in a direction forming an angle with the direction of movement of said body, an indicating device, said displaceable member being connected to said indicating device, a member provided with a face, inclined to the direction of movement of said displaceable member, said body being movable on said face, a touch element displaceable in a direction forming an angle with the direction of movement of said body, the movement of said touch element producing movement of said body.

The foregoing specification signed at Sweden, this 6th day of October, 1920.

MAX BARTHOLDY.

In presence of—
P. A. HERNELL,
G. SJÄGNER.